United States Patent
Zheng

(10) Patent No.: US 11,762,148 B2
(45) Date of Patent: Sep. 19, 2023

(54) CONTROL SYSTEMS AND METHODS FOR ALIGNING MULTICORE FIBER OPTIC CABLES

(71) Applicant: AFL Telecommunications LLC, Duncan, SC (US)

(72) Inventor: Wenxin Zheng, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 17/539,967

(22) Filed: Dec. 1, 2021

(65) Prior Publication Data

US 2022/0171130 A1    Jun. 2, 2022

Related U.S. Application Data

(60) Provisional application No. 63/120,040, filed on Dec. 1, 2020.

(51) Int. Cl.
| | |
|---|---|
| G02B 6/255 | (2006.01) |
| B29D 11/00 | (2006.01) |
| G02B 6/02 | (2006.01) |

(52) U.S. Cl.
CPC ...... *G02B 6/2555* (2013.01); *B29D 11/00663* (2013.01); *G02B 6/02042* (2013.01)

(58) Field of Classification Search
None
See application file for complete search history.

(56) References Cited

U.S. PATENT DOCUMENTS

| | | | |
|---|---|---|---|
| 5,572,313 A | 11/1996 | Zheng et al. | |
| 9,213,134 B2* | 12/2015 | Chen | G02B 6/02042 |
| 9,541,707 B2* | 1/2017 | Saito | C03B 37/01222 |
| 10,612,998 B2 | 4/2020 | Zheng et al. | |
| 10,620,372 B2* | 4/2020 | Matsui | G01B 11/27 |
| 10,996,397 B2* | 5/2021 | Zheng | G02B 6/2555 |
| 2010/0209049 A1 | 8/2010 | Zheng et al. | |
| 2018/0372954 A1* | 12/2018 | Matsui | G02B 6/4221 |
| 2019/0113682 A1* | 4/2019 | Sakuma | G02B 6/02 |
| 2021/0088729 A1* | 3/2021 | Bradley | G02B 6/2551 |
| 2022/0171130 A1* | 6/2022 | Zheng | G02B 6/2555 |

\* cited by examiner

*Primary Examiner* — Rhonda S Peace
(74) *Attorney, Agent, or Firm* — Dority & Manning, P.A.

(57) ABSTRACT

Systems and methods of aligning multicore fiber optic cables are provided. A method for aligning a first multicore fiber (MCF) and a second multicore fiber (MCF), the first MCF and second MCF each comprising a plurality of cores and a marker, the method including: producing a brightness profile for the first and second MCFs; determining rotational orientations of the first and second MCFs from the brightness profile; rotating at least one of the first and second MCFs until each of the plurality of cores of the first MCF and the second MCF are aligned; determining if the markers of the first MCF and second MCF are aligned in view of a region of the brightness profile associated with the markers; and splicing the first MCF and the second MCF together if the cores and marker of the first MCF are aligned with the cores and marker of the second MCF.

20 Claims, 7 Drawing Sheets

CONTROL SYSTEMS AND METHODS FOR ALIGNING MULTICORE FIBER OPTIC CABLES

CROSS-REFERENCE TO RELATED APPLICATIONS

The present application claims priority to U.S Provisional Patent Application 63/120,040 filed on Dec. 1, 2020, the disclosure of which is incorporated by reference herein in its entirety

FIELD

The present disclosure relates generally to control systems and methods of aligning multicore fiber optic cables.

BACKGROUND

Multicore fiber (MCF) optic cables contain a plurality of fiber cores, thus reducing the number of fibers required in optical networks. MCF cables also add bandwidth density to optical networks. However, MCF cables present a number of challenges as compared to single fiber optical cables. In particular, identifying and splicing each of the cores is a challenge, particularly when splicing together adjacent MCF cables.

Optical fibers are typically spliced together, e.g., at junctions. During splicing operations it is necessary for the optical fibers to be precisely aligned or loss may be incurred. The greater the loss, the less effective the optical cables are at transmitting data.

Accordingly, improved methods and systems for splicing MCF cables are desired in the art. In particular, methods and systems which allow for automated, or semi-automated, alignment between adjacent MCF cables would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a method for aligning a first MCF and a second MCF is provided. The first and second MCFs each include a plurality of cores and a marker. The method includes producing a brightness profile for the first MCF and for the second MCF; determining rotational orientations of the first MCF and the second MCF from the brightness profile; rotating at least one of the first MCF and the second MCF until each of the plurality of cores of the first MCF and the second MCF are aligned; determining if the markers of the first MCF and second MCF are aligned in view of a region of the brightness profile associated with the markers; and splicing the first MCF and the second MCF together if the cores and marker of the first MCF are aligned with the cores and marker of the second MCF.

In accordance with another embodiment, a control system for aligning a first MCF and a second MCF is provided. The first and second MCFs each include a plurality of cores and a marker. The control system includes a light source; a camera; an alignment platform configured to align the first multimode optical fiber and second multimode optical fiber; and a controller in communication with the light source, the camera, and the alignment platform, the controller operable to: produce a brightness profile for the first MCF and for the second MCF; determine rotational orientations of the first MCF and the second MCF; rotate at least one of the first MCF and the second MCF until each of the plurality of cores of the first MCF and the second MCF are aligned; and determine if the markers of the first MCF and the second MCF are aligned in view of a region of the brightness profile associated with the markers.

In accordance with another embodiment, a control system for aligning a first MCF and a second MCF is provided. The first and second MCFs each include a plurality of cores and a marker. The control system includes a controller operable to: produce a brightness profile for the first MCF and for the second MCF; determine rotational orientations of the first MCF and the second MCF; rotate at least one of the first MCF and the second MCF until each of the plurality of cores of the first MCF and the second MCF are aligned; and determine if the markers of the first MCF and the second MCF are aligned in view of a region of the brightness profile associated with the markers.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
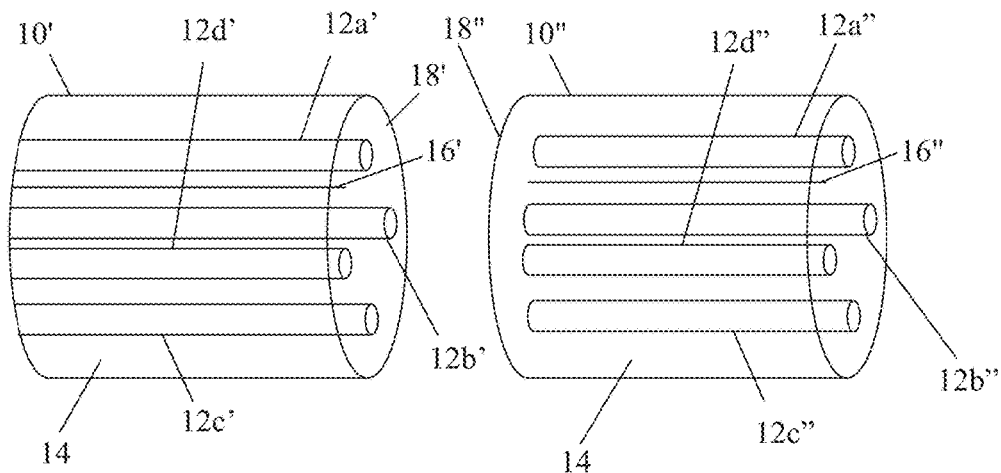
FIG. 1 is a perspective view of two multicore fibers (MCF) each including a plurality of cores and a marker in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features. not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, control systems and methods described herein can be used to align multicore fibers for purpose of, e.g., splicing the fibers together. The control systems and methods described herein utilize markers contained within the fibers along with brightness profiles obtained from the control system to determine and align the fibers together. Once aligned, the fibers can be spliced together with minimum optical loss.

Referring now to the drawings, methods and control systems for aligning multicore fibers (MCFs) 10 are provided. More specifically, methods and control systems for aligning a first MCF 10' and a second MCF 10" are provided. Such methods and control systems can provide for precise, accurate alignment of the cores 12 of the MCFs, which in turn can facilitate optical fiber processing activities such as splicing.

Referring to FIG. 1, MCFs 10 generally include a plurality of cores 12. For instance, the first MCF 10' includes a first core 12a', a second core 12b', a third core 12c', and a fourth core 12d' while the second MCF 10" includes a first core 12a", a second core 12b", a third core 12c", and a fourth core 12d". In other embodiments, the MCF optic cables 10 can include a different number of cores 12, such as for example two cores 12, three cores 12, five cores 12, six cores 12, seven cores 12, eight cores 12, nine cores 12, ten cores 12, or more. The cores 12 can be spaced apart from one another. In an embodiment, the cores 12 can include a central core 12 and a plurality of outer cores 12 disposed therearound. In another embodiment, the cores 12 can be disposed in another arrangement, such as without a central core 12 as illustrated in FIG. 1. The cores 12 may be rotationally symmetrical, reflectively symmetrical, or both. This symmetricity may make it difficult to distinguish between the cores 12.

The cores 12 may be configured to transmit optical light through the MCFs 10. By way of non-limiting example, the cores 12 may be made of silica-based glass, such as pure silica glass. The cores 12 may or may not include dopant for adjusting refractive index of the MCFs 10.

The cores 12 may be surrounded by a cladding 14. One or more coating layers (not shown) may surround the cladding 14. A marker 16 (16' and 16" respectively for first and second MCF 10' and 10") may be included in the first and second MCFs 10' and 10". The marker 16 can extend to ends 18 (18' and 18" respectively for first and second MCF 10' and 10") of the MCFs 10 as shown in FIG. 1. The marker 16 may assist in aligning the MCFs 10 together, e.g., as part of a splicing operation. In one or more embodiments, the marker 16 is disposed most adjacent to the first core 12a', 12a". In this regard, the first cores 12a', 12a" can be readily distinguished from the other cores 12 and the MCF can be readily identified using systems and methods described herein. More particularly, the first cores 12a', 12a" can be easily discerned given their position with respect to the marker 16. Based on the type of MCF, discussed below, the remainder of the cores 12 can then be easily identified.

Figure 2:
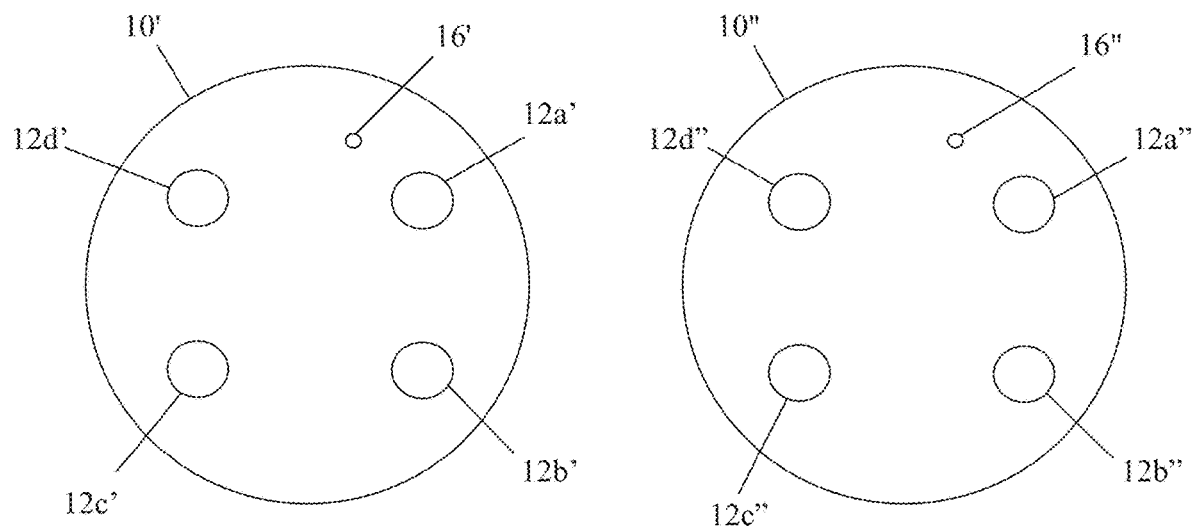
FIG. 2 is a longitudinal end view of the two MCFs from FIG. 1 in accordance with an embodiment of the present disclosure.

FIG. 2 illustrates end views of the first and second MCFs 10' and 10" with the ends of the first and second MCFs 10' and 10" mirrored, i.e., looking along a longitudinal axis of the MCFs 10' and 10" from the ends 18', 18". As depicted, the first, second, third, and fourth cores 12a', 12b', 12c', 12d', 12a", 12b", 12c", and 12d" of the first and second MCFs 10' and 10" are arranged in a clockwise distribution about the MCFs 10' and 10". Conversely, referring to FIG. 3, which depicts end views of the first and second MCFs 10' and 10"

in accordance with another embodiment, the first, second, third, and fourth cores 12a', 12b', 12c', 12d', 12a", 12b", 12c", and 12d" of the first and second MCFs 10' and 10" are arranged in a counterclockwise distribution about the MCFs 10' and 10". The MCFs 10' and 10" depicted in FIG. 2 may be given a first designation while the MCFs 10' and 10" depicted in FIG. 3 may be given a second designation different from the first designation to indicate the different direction of optical core arrangement.

Figure 4:
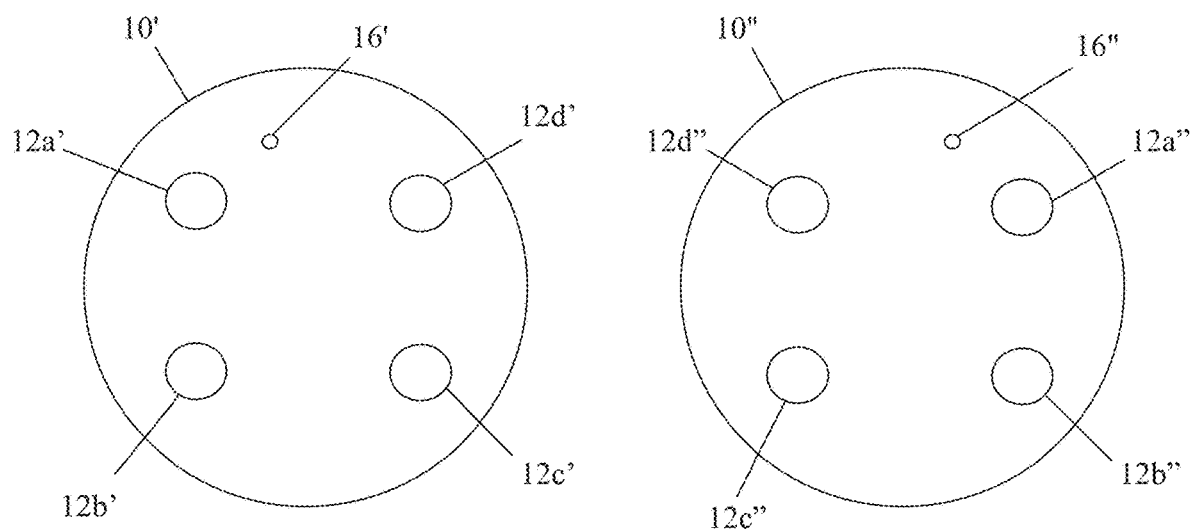
FIG. 4 is a longitudinal end view of the two MCFs from FIG. 1 in accordance with another embodiment of the present disclosure.

Referring to FIG. 4, which depicts end views of the first and second MCFs 10' and 10" in accordance with yet another embodiment, the first, second, third, and fourth cores 12a', 12b', 12c', and 12d' of the first MCF 10' are arranged in a counterclockwise distribution and the first, second, third, and fourth cores 12a", 12b", 12c", and 12d" of the second MCF 10" are arranged in a clockwise distribution.

Figure 3:
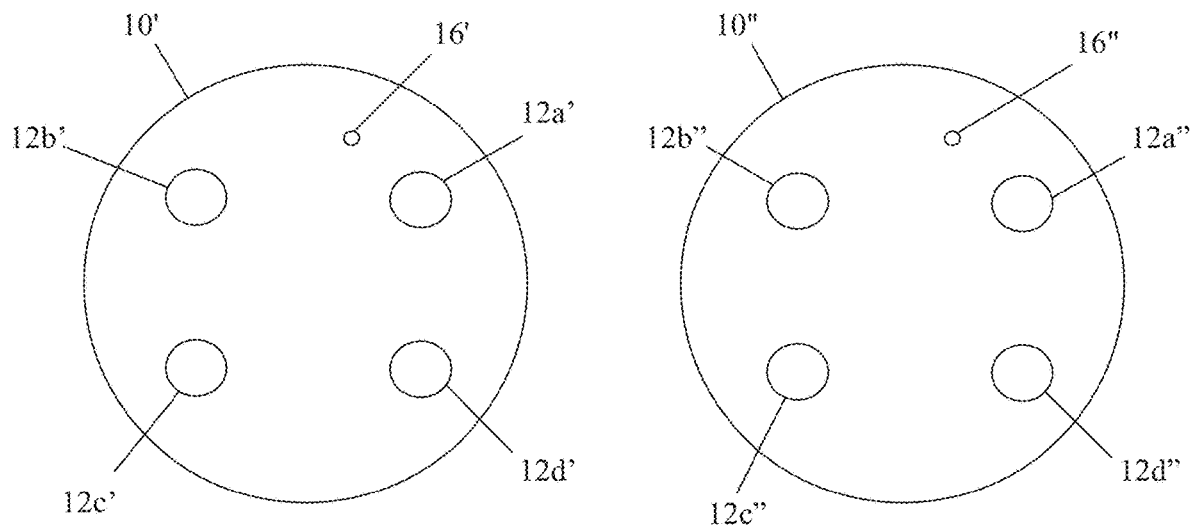
FIG. 3 is a longitudinal end view of the two MCFs from FIG. 1 in accordance with another embodiment of the present disclosure.

The markers 16 depicted in FIG. 2 are both disposed above and to the left of a central position of the MCFs 10' and 10". The markers 16 depicted in FIG. 3 are disposed above and to the right of a central position of the MCFs 10' and 10". The markers 16 depicted in FIG. 4 are differentially located with respect to the central position of the MCFs 10' and 10". Specifically, the marker 16' of the first MCF 10' is disposed above and to the left of the central position while the marker 16" of the second MCF 10" is disposed above and to the right of the central position.

The first and second MCFs 10' and 10" depicted in FIGS. 2 and 3 are configured to be spliced together. To the contrary, the first and second MCFs 10' and 10" depicted in FIG. 4 are not configured to be spliced together. This is easily discernable in view of the location of the markers 16' and 16". When the markers 16' and 16" align with one another, splicing is possible. When the markers 16' and 16" do not align with one another, splicing is not possible or will result in inferior splice quality. In this regard, the relative alignment of the marker 16 with respect to the cores 12 may be useful information when performing operations with the MCFs 10.

Figure 5:
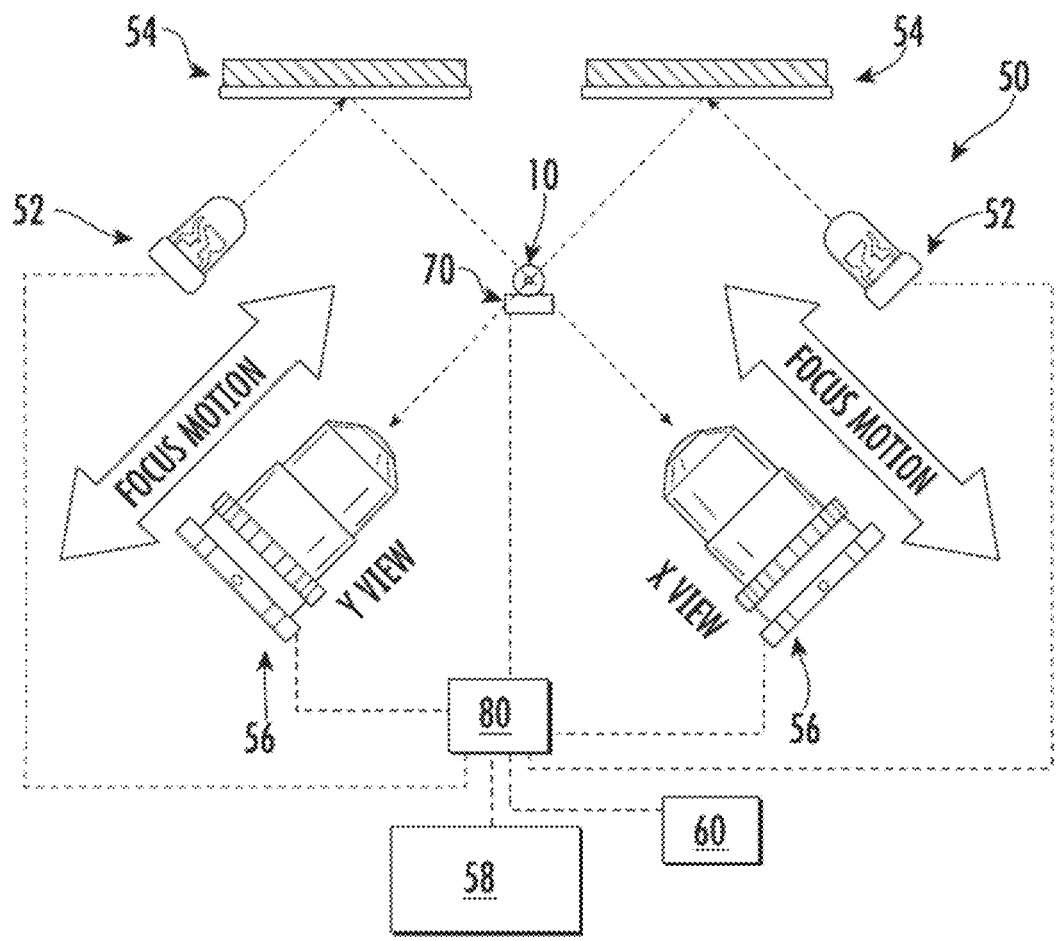
FIG. 5 is a schematic view of a control system in accordance with an embodiment of the present disclosure.

FIG. 5 illustrates a view of a control system 50 for use in accordance with one or more embodiments of the present disclosure. Control systems 50 may be utilized to align MCFs 10. By way of example, the control system 50 may include one or more light sources 52. In exemplary embodiments, the light source(s) 52 may be light emitting diodes ("LEDs") or other suitable sources of light. The light sources 52 may generally emit light which is directed to, through, and/or past the MCFs 10 in order to facilitate the generation of brightness profiles for the MCFs 10, which in turn facilitates alignment of the MCFs 10. The control system 50 may further include, for example, one or more mirrors 54. Mirrors 54 may reflect the light emitted by light sources 52 such that the light is directed to, through, and/or past the MCFs 10. The control system 50 may further include, for example, one or more cameras 56. Cameras 56 may capture images of the MCFs 10 which may be utilized during alignment of the MCFs 10. Suitable cameras 56 may be, for example, CMOS or CCD cameras 56. Cameras 56 may be directed towards the MCFs 10 such that the MCFs 10 (in exemplary embodiments at or near the ends 18 thereof) are visible through the cameras 56. One or more cameras 56 may be directed towards each MCFs 10' and 10". In exemplary embodiments, at least two cameras 56 are directed towards each MCF 10' and 10". The cameras 56 may be oriented generally perpendicular to each other, such that one camera 56 captures images along a first axis and the other camera 56 captures images along a second axis. The first and second axis may, for example, be X- and Y-axis, respectively. The longitudinal axis of the MCFs 10' and 10" can correspond with, or correspond generally with, the Z-axis.

The control system 50 may further include a display 58. The display 58 may output images for a user to view during operation of the control system 50. For example, display 58 may be connected to the camera(s) 56 and/or other components of the control system 50. In exemplary embodiments, images captured by the camera(s) 56 are output to the display for user viewing purposes.

The control system 50 may further include one or more user input controls 60. User input controls 60 may be, for example, buttons, knobs, levers, switches, etc., which allow a user to input commands to the control system 50. User input controls 60 may be connected to one or more other components of the control system 50, such as the light source(s) 52, camera(s) 56, display 58, alignment platform 70, controller 80, etc.

The control system 50 may further include an alignment platform 70. Alignment platform 70 may include a first component (not illustrated) on which the first MCF 10' is disposed and a second component (not illustrated) on which the second MCF 10" is disposed. The first component and second component may be or include, for example, fiber clamps or other suitable apparatus for securing the MCFs 10. One or both of the first component or second component may be moveable to align the first MCF 10' and second MCF 10". Such movement may be along the first axis and/or the second axis. In exemplary embodiments, both first MCF 10' and second MCF 10" are movable along the first axis and second axis.

The control system 50 may further include other components, or may be part of an assembly or system, which provide additional or alternative functionalities or processes. For example, the control system 50 may include components for splicing or be part of a splicer apparatus, such that a heat source (such as a $CO_2$ laser or electric arc) is included.

The control system 50 may further include a controller 80. The controller 80 may be in communication with one or more of the other control system 50 components, such as the light source 52, mirrors 54, cameras 56, display 58, user input controls 60, alignment platform 70 (such as the first and second components,), etc. The controller 80 may generally be operable to operate or receive input from such components in accordance with embodiments of the present disclosure, as discussed herein. In particular, the controller 80 may be operable to perform the various method steps for aligning first and second MCFs 10', 10" as discussed herein.

The controller 80 may include a memory and microprocessor, such as a general or special purpose microprocessor operable to execute programming instructions or microcontrol code associated with processing of signals from the light source 52, mirrors 54, cameras 56, display 58, user input controls 60, alignment platform 70, etc. The memory may represent random access memory such as DRAM, or read only memory such as ROM or FLASH. In one embodiment, the processor executes programming instructions stored in memory. The memory may be a separate component from the processor or may be included onboard within the processor.

Figure 6:
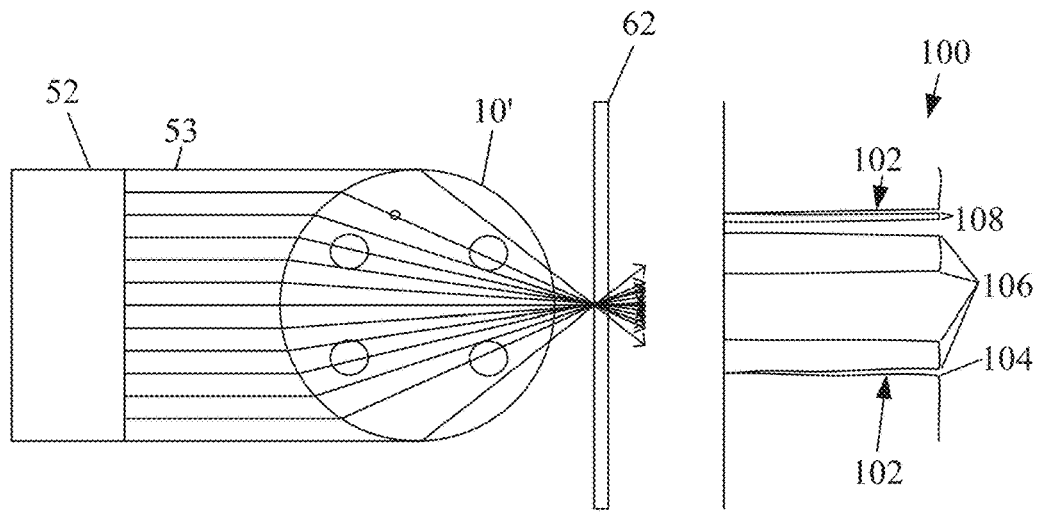
FIG. 6 is a schematic view of a control system used to produce a brightness profile for an MCF in accordance with an embodiment of the present disclosure.

FIG. 6 illustrates a schematic view of a step of aligning the MCFs 10 prior to splicing. In particular, FIG. 6 illustrates a step of producing a brightness profile 100 for the first MCF 10'. The brightness profile 100 may, for example, be produced by the control system 50. For example, a camera 56 may capture an image of the first MCF 10' as seen at a focal plane 62. The image may be taken when emitted light 53 from the light source 52 is directed through the MCF 10.

Such image may constitute the brightness profile 100. In exemplary embodiments, brightness profiles 100 may be output to display 58. A similar brightness profile 100 may be captured for the second MCF 10". It is noted that the brightness profile 100 depicted in FIG. 6 is a schematic illustration only and is not necessarily drawn to scale. The depicted brightness profile 100 does not constitute a necessary brightness profile shape, contour, or relative sizing. In practice, the brightness profile 100 may vary. For instance, the brightness profile 100 can have peak heights with sharp or rounded tips, variably shaped tips, sharp or rounded troughs, peaks and troughs with variable height, etc.

By way of example, the brightness profile 100 may illustrate cladding edges 102, cladding diffraction lines 104, core diffraction lines 106, and marker diffraction lines 108 as illustrated. The camera 56 may be adjusted prior to capturing the image such that the cladding edges 102, cladding diffraction lines 104, core diffraction lines 106, and marker diffraction lines 108 are visible in the brightness profile 100. This may be accomplished, for example, by adjusting the focal plane 62.

The brightness profiles 100 of the MCFs 10 may be taken on lines perpendicular to the longitudinal axes of the MCFs 10. For example, brightness profiles 100 may be taken along the first axis and/or along the second axis. While FIG. 6 illustrates a brightness profile 100 taken along the first axis, it should be understood that the concept illustrated in FIG. 6 and discussed herein may equally apply to obtain a brightness profile 100 along the second axis.

The brightness profile 100 changes as the MCF 10 is rotated. For instance, at least the core diffraction lines 106 and the marker diffraction lines 108 may move relative to the cladding edges 102 as the MCF 10 is rotated. This relative movement can be detected in the brightness profile 100. Accordingly, the relative angular position of the MCF 10 can be determined from the brightness profile 100, and more particularly from the relative locations of at least the core diffraction lines 106 and the marker diffraction lines 108.

Figure 7:
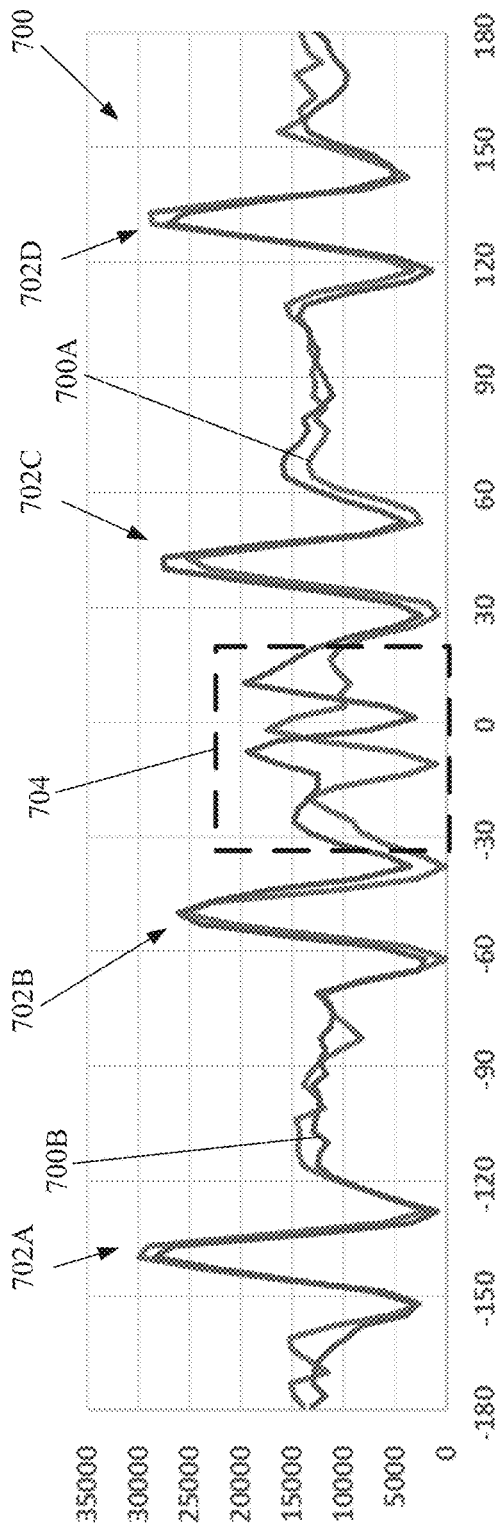
FIG. 7 is a graph plotting contrast of the brightness profile as a function of rotational orientation of the MCFs in accordance with an embodiment of the present disclosure.
Figure 8:
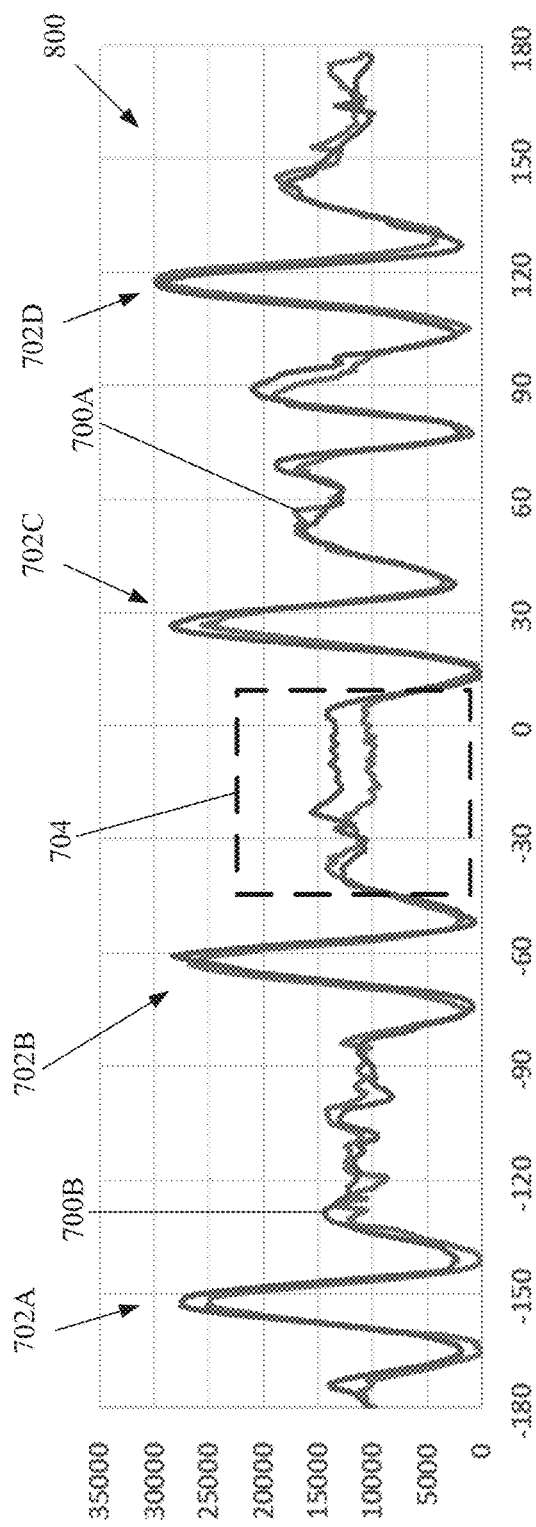
FIG. 8 is a graph plotting contrast of the brightness profile as a function of rotational orientation of the MCFs in accordance with another embodiment of the present disclosure.

FIGS. 7 and 8 illustrate exemplary contrast profiles 700 and 800 of two different cable interfaces as measured using the obtained brightness profile 100, e.g., as determined in FIG. 6. The X-axis represents the rotational angle of the MCF 10 and the Y-axis represents the relative contrast of the MCF 10 at that rotational angle.

The contrast profile 700 depicted in FIG. 7 includes a first contrast profile 700A of a first MCF 10 and a second contrast profile 700B of a second MCF 10. The first MCF 10 corresponding with the first contrast profile 700A may, for example, have a layout similar to the MCF 10" in FIG. 4 while the second MCF 10 corresponding with the second contrast profile 700B may, for example, have a layout similar to the MCF 10' in FIG. 4 (or vise versa). These two profiles 700A and 700B each include indications of four cores 12 as shown at locations 702A, 702B, 702C, and 702D. These indications appear as differentiated contrast levels, and more particularly as peaks in contrast value.

While the four cores 12 may appear aligned with respect to one another, as evidenced by matching peaks at locations 702A, 702B, 702C, and 702D, the MCFs 10 of the first contrast profile 700A are not aligned. This lack of alignment is discernable at region 704. Region 704 generally corresponds with a region of the contrast profile 700 associated with the markers of the MCFs 10. The first and second contrast profiles 700A and 700B diverge within region 704. This divergence may be related to the relative angular rotational displacement between the markers 16 within the MCFs 10. That is, as depicted in FIG. 4, the marker 16' of the first MCF 10' is laterally offset from the central position to the left while the marker 16" of the second MCF 10" is laterally offset from the central position to the right of the marker 16". This divergence in marker alignment results in contrasting marker diffraction lines and corresponding differences in the contrast profiles 700A and 700B within region 704.

The contrast profile 800 depicted in FIG. 8 includes a first contrast profile 800A of a first MCF 10 and a second contrast profile 800B of a second MCF 10. The first MCF 10 corresponding with the first contrast profile 800A may, for example, have a layout similar to the MCF 10" in FIG. 2 while the second MCF 10 corresponding with the second contrast profile 800B may, for example, have a layout similar to the MCF 10' in FIG. 2. Alternatively, the MCFs 10' and 10" may correspond with the MCFs 10' and 10" in FIG. 3. These two profiles 800A and 800B each include indications of four cores 12 as shown at locations 802A, 802B, 802C, and 802D. Similar to the description for FIG. 7, these indications can appear as differentiated contrast levels, and more particularly as peaks in contrast value.

Unlike with FIG. 7 which indicates misalignment between the MCFs 10, as determined in view of divergence within region 704, the first and second contrast profiles 800A and 800B are aligned with respect to one another. This alignment is discernable at region 804. Region 804, similar to region 704, generally corresponds with a region of the contrast profile 800 associated with the markers of the MCFs 10. However, unlike the first and second contrast profiles 700A and 700B at region 704 in FIG. 7, the first and second contrast profiles 800A and 800B at region 804 are generally similar. That is, the first and second contrast profiles 800A and 800B are generally in-phase with one another. Deviations in wave amplitude may be visible, however the first and second contrast profiles 800A and 800B are not phase shifted with respect to one another like with the first and second contrast profiles 700A and 700B in region 704 of FIG. 7. Thus, the MCFs 10 that formed the first and second contrast profiles 800A and 800B are aligned with one another and ready for splicing.

Figure 9:
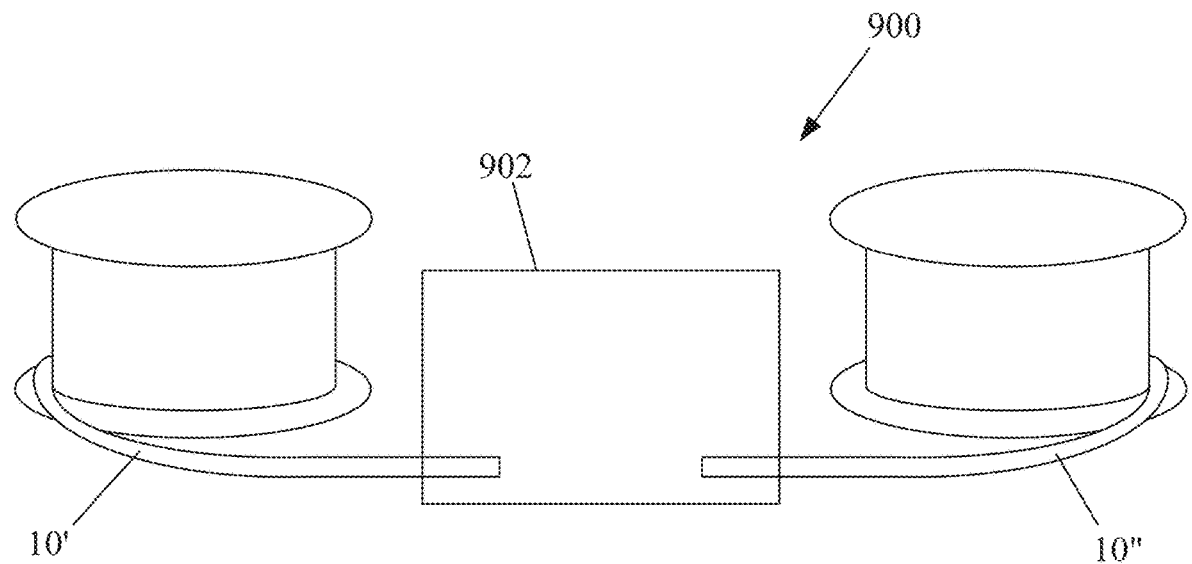
FIG. 9 is a schematic view of a portion of a control system including a splicer in accordance with an embodiment of the present disclosure.
Figure 10:
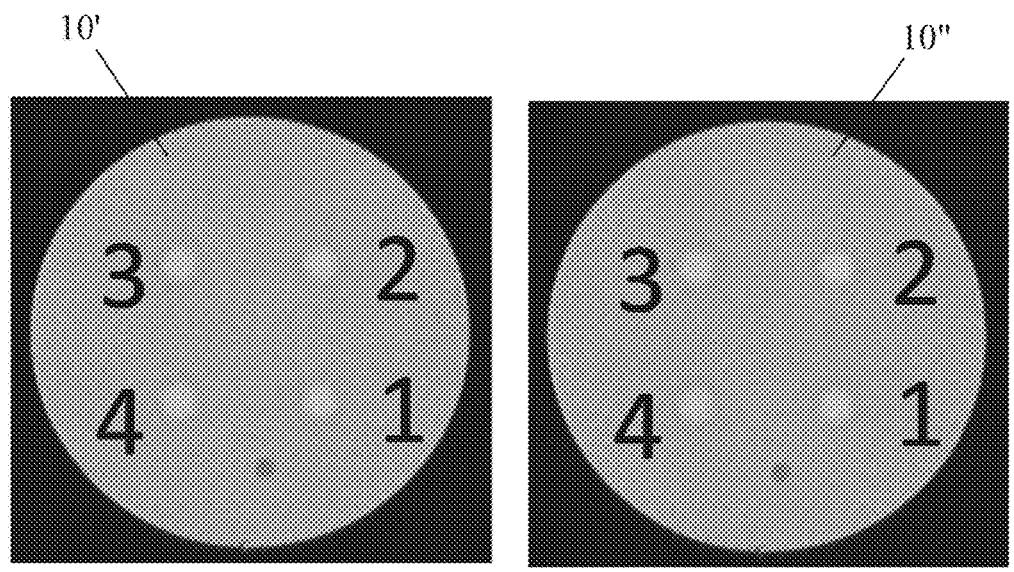
FIG. 10 is a longitudinal end view of the two MCFs from FIG. 9 in accordance with an embodiment of the present disclosure.

FIG. 9 illustrates an exemplary embodiment of a system 900 for aligning and splicing a first MCF 10' and a second MCF 10" together. FIG. 10 illustrates mirrored end views of the MCFs 10' and 10" as seen within the system 900 depicted in FIG. 9. The ends of the MCFs 10' and 10" terminate within a splicer 902 (FIG. 9). The ends of the depicted MCFs 10' and 10" are aligned for splicing. In this regard, a contrast profile of the MCFs 10' and 10" depicted in FIGS. 9 and 10 would be more similar to the contrast profile of FIG. 8 than FIG. 7.

Figure 11:
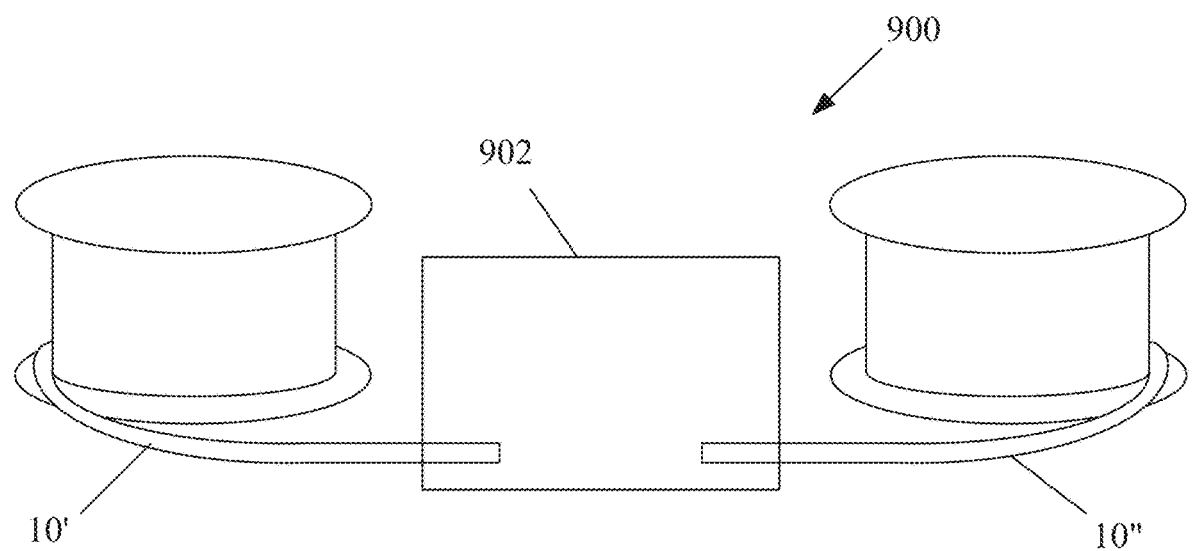
FIG. 11 is a schematic view of a portion of a control system including a splicer in accordance with an embodiment of the present disclosure.
Figure 12:
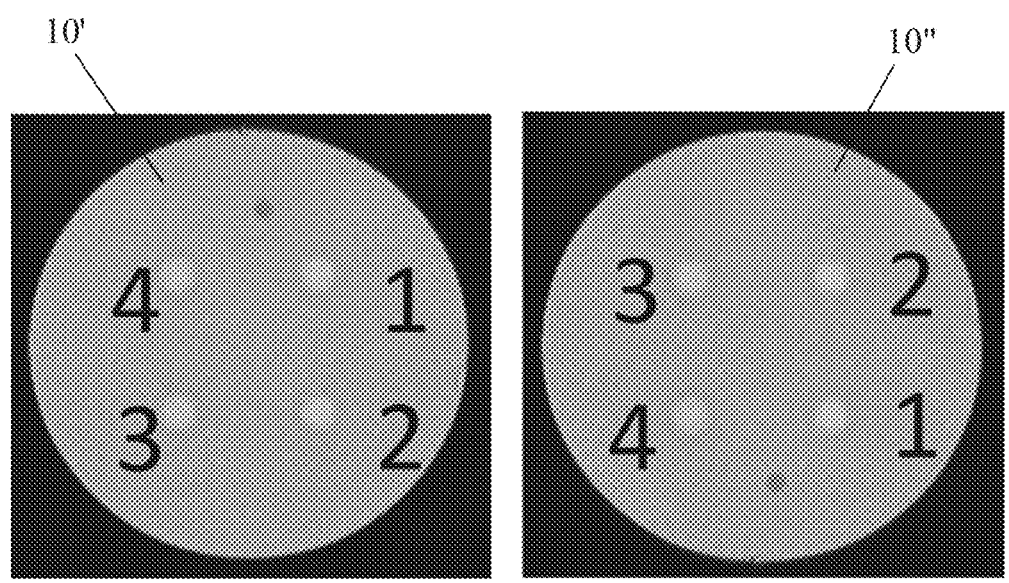
FIG. 12 is a longitudinal end view of the two MCFs from FIG. 11 in accordance with an embodiment of the present disclosure.

FIG. 11 illustrates an exemplary embodiment of the system 900 for aligning and splicing a different first MCF 10' and a different second MCF 10" together. FIG. 12 illustrates mirrored end views of the MCFs 10' and 10" as seen within the system 900 depicted in FIG. 11. The ends of the MCFs 10' and 10" terminate within the splicer 902 (FIG. 11). The ends of the MCFs 10' and 10" depicted in FIG. 12 are not aligned for splicing. A contrast profile of the MCFs 10' and 10" depicted in FIGS. 11 and 12 would be more similar to the contrast profile of FIG. 7 than FIG. 8 in that the region 704, 804 corresponding with the markers of the MCFs 10' and 10" would be out of phase with one another.

As illustrated in FIG. 12, the marker 16' is located at a top position of the MCF 10' while the marker 16" is located at a bottom position of the MCF 10". This problem is easily fixed by flipping either one of the MCFs 10' or 10" and using the other end of the MCF 10' or 10" at the interface formed between the MCFs 10' and 10". In instances where the control system 50 is utilized, a warning may be provided, e.g., on the display 58, indicating marker direction mismatch. In response to this warning, the operator may flip one of the MCFs 10' or 10" to use the opposite end thereof Alternatively, the control system 50 may be configured to autonomously, or semi-autonomously, flip the MCF 10' or 10" to incur proper matching. Alignment can then be performed by rotating one or both of the MCFs 10' and/or 10" until alignment is achieved. This alignment can be performed manually, semi-autonomously (e.g., by the control system 50), or fully autonomously.

In an embodiment, the control system 50 can be configured to learn from previous operations. That is, the control system 50 may include a processor configured to run one or more software programs stored on a memory device. The processor can be configured to learn from previous aligning operations using the stored software programs. In this regard, aligning operations may become easier and quicker. Additionally, new MCF types (e.g., MCF having different core layouts) can be handled using machine learning techniques.

Figure 13:
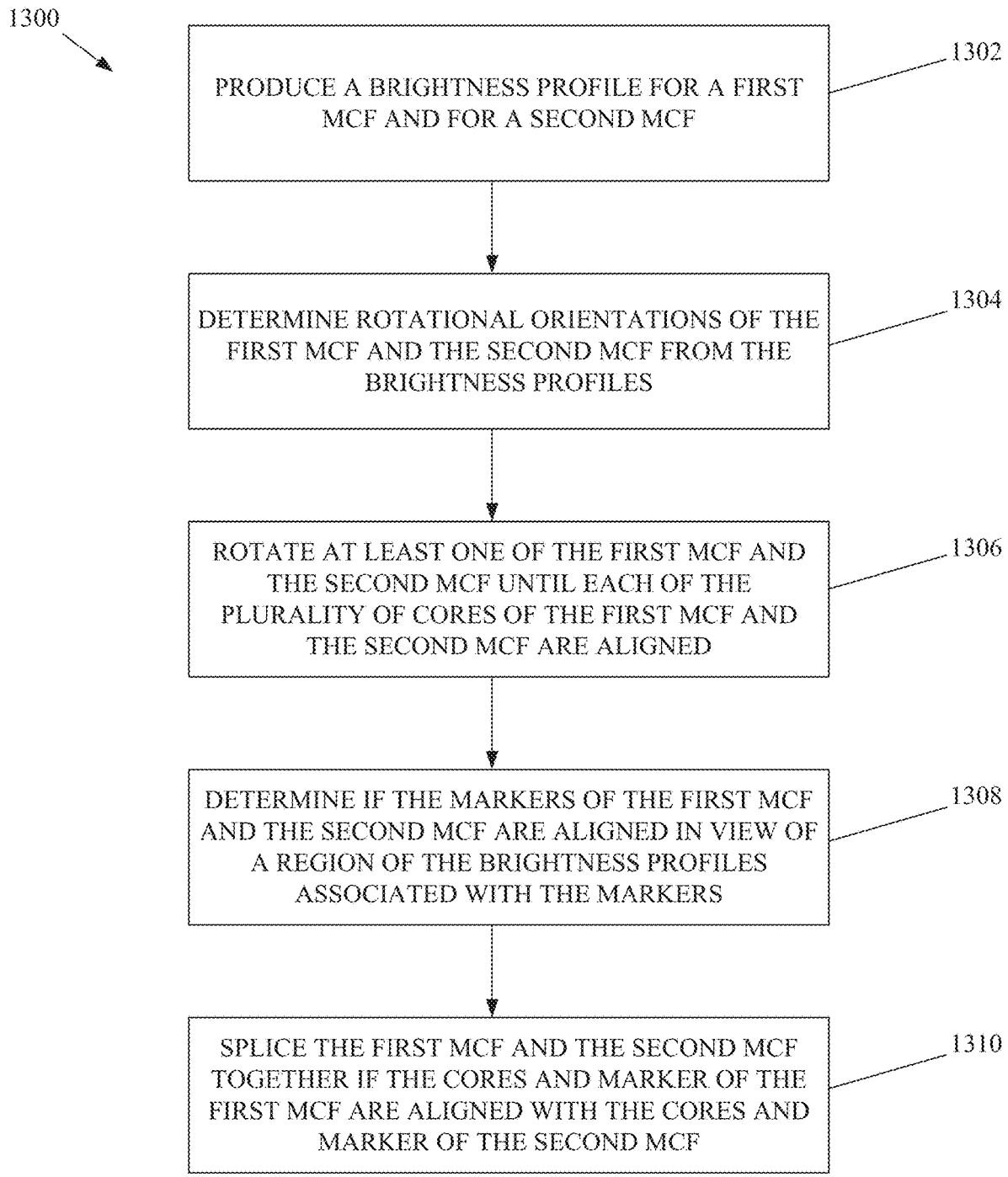
FIG. 13 is a flow chart of a method of aligning a first MCF and a second MCF in accordance with an embodiment of the present disclosure.

FIG. 13 illustrates a flow chart of a method 1300 of aligning a first MCF and a second MCF. The method 1300 can generally include a step 1302 of producing a brightness profile for the first MCF and for the second MCF. The step 1302 of producing the brightness profiles can involve emitting a light toward the MCFs in a direction generally perpendicular to longitudinal axes of the MCFs. The light can diffract within the MCFs and be viewed by a camera along a focal plane. The method 1300 can further include a step 1304 of determining rotational orientations of the first MCF and the second MCF from the brightness profiles. The step 1304 can be performed in view of brightness profiles obtained from known MCFs. The brightness profiles obtained at step 1302 can be compared against these known brightness profiles. The method 1300 can further include a step 1306 of rotating at least one of the first MCF and the second MCF until each of the plurality of cores of the first MCF and the second MCF are aligned. The method 1300 can further include a step 1308 of determining if the markers of the first MCF and the second MCF are aligned in view of a region of the brightness profiles associated with the markers. The method 1300 can further include a step 13010 of splicing the first MCF and the second MCF together if the cores and marker of the first MCF are aligned with the cores and marker of the second MCF.

Further aspects of the invention are provided by one or more of the following embodiments:

Embodiment 1. A method for aligning a first multicore fiber (MCF) and a second multicore fiber (MCF), the first MCF and second MCF each comprising a plurality of cores and a marker, the method comprising: producing a brightness profile for each of the first MCF and for the second MCF; determining rotational orientations of the first MCF and the second MCF from the brightness profiles; rotating at least one of the first MCF and the second MCF until each of the plurality of cores of the first MCF and the second MCF are aligned; determining if the markers of the first MCF and second MCF are aligned in view of a region of the brightness profiles associated with the markers; and splicing the first MCF and the second MCF together if the cores and marker of the first MCF are aligned with the cores and marker of the second MCF.

Embodiment 2. The method of any one or more of the embodiments, wherein rotating at least one of the first MCF and the second MCF is performed prior to determining if the markers are aligned.

Embodiment 3. The method of any one or more of the embodiments, further comprising generating a warning for direction mismatch if the first and second MCFs are determined to be misaligned in view of the region of the brightness profile associated with the markers.

Embodiment 4. The method of any one or more of the embodiments, further comprising: flipping one of the first or second MCFs in response to the warning; and rotating at least one of the first or second MCFs until each of the plurality of cores of the first MCF and the second MCF are aligned.

Embodiment 5. The method of any one or more of the embodiments, wherein flipping one of the first or second MCFs is performed at least partially autonomously.

Embodiment 6. The method of any one or more of the embodiments, wherein the first and second MCFs define longitudinal axes, and wherein the brightness profiles are taken on lines perpendicular to the longitudinal axes of the first and second MCFs.

Embodiment 7. The method of any one or more of the embodiments, wherein determining rotational orientations of the first and second MCFs is performed in view of a saved data associated with the first and second MCFs.

Embodiment 8. The method of any one or more of the embodiments, wherein the saved data comprises saved brightness profiles, the saved brightness profiles being produced by rotating one or more known MCFs and capturing a brightness profile of each of the one or more known MCFs during rotation.

Embodiment 9. A control system for aligning a first MCF and a second MCF, the first and second MCFs each including a plurality of cores and a marker, the control system comprising: a light source; a camera; an alignment platform configured to align the first multimode optical fiber and second multimode optical fiber; and a controller in communication with the light source, the camera, and the alignment platform, the controller operable to: produce a brightness profile for the first MCF and for the second MCF; determine rotational orientations of the first MCF and the second MCF; rotate at least one of the first MCF and the second MCF until each of the plurality of cores of the first MCF and the second MCF are aligned; and determine if the markers of the first MCF and the second MCF are aligned in view of a region of the brightness profile associated with the markers.

Embodiment 10. The control system of any one or more of the embodiments, wherein the controller is further operable to splice the first MCF and the second MCF together if the cores and the marker of the first MCF are aligned with the cores and marker of the second MCF.

Embodiment 11. The control system of any one or more of the embodiments, wherein the controller is configured to rotate the at least one of the first MCF and the second MCF by controlling the alignment platform.

Embodiment 12. The control system of any one or more of the embodiments, wherein the controller is further operable to generate a warning for direction mismatch if the first and second MCFs are determined to be misaligned in view of the region of the brightness profile associated with the markers.

Embodiment 13. The control system of any one or more of the embodiments, wherein the controller is further operable to at least semi-autonomously flip one of the first or second MCFs if the markers are determined to have direction mismatch.

Embodiment 14. The control system of any one or more of the embodiments, wherein the first and second MCFs define longitudinal axes, and wherein the light source is configured to emit light toward at least one of the first MCF and second MCF in a direction perpendicular to the longitudinal axis thereof.

Embodiment 15. The control system of any one or more of the embodiments, wherein the controller determines at least one of rotational orientation of the first MCF and the second MCF or marker alignment in view of saved brightness profiles of one or more known MCFs.

Embodiment 16. A control system for aligning a first MCF and a second MCF, the first and second MCFs each including a plurality of cores and a marker, the control system comprising: a controller operable to: produce a brightness profile for the first MCF and for the second MCF; determine rotational orientations of the first MCF and the second MCF; rotate at least one of the first MCF and the second MCF until each of the plurality of cores of the first MCF and the second MCF are aligned; and determine if the markers of the first MCF and the second MCF are aligned in view of a region of the brightness profile associated with the markers.

Embodiment 17. The control system of any one or more of the embodiments, wherein the controller is further operable to splice the first MCF and the second MCF together if the cores and the marker of the first MCF are aligned with the cores and marker of the second MCF.

Embodiment 18. The control system of any one or more of the embodiments, wherein the controller is further operable to generate a warning for direction mismatch if the first and second MCFs are determined to be misaligned in view of the region of the brightness profile associated with the markers.

Embodiment 19. The control system of any one or more of the embodiments, wherein the controller is further operable to at least semi-autonomously flip one of the first or second MCFs if the markers are determined to have direction mismatch.

Embodiment 20. The control system of any one or more of the embodiments, wherein the controller determines at least one of rotational orientation of the first MCF and the second MCF or marker alignment in view of saved brightness profiles of one or more known MCFs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for aligning a first multicore fiber (MCF) and a second multicore fiber (MCF), the first MCF and second MCF each comprising a plurality of cores and a marker, the method comprising:
    producing a brightness profile for the first MCF and for the second MCF;
    determining rotational orientations of the first MCF and the second MCF from the brightness profiles;
    rotating at least one of the first MCF and the second MCF until each of the plurality of cores of the first MCF and the second MCF are aligned;
    determining if the markers of the first MCF and second MCF are aligned in view of a region of the brightness profiles associated with the markers, the region including less than the entire brightness profiles; and
    splicing the first MCF and the second MCF together if the cores and marker of the first MCF are aligned with the cores and marker of the second MCF.

2. The method of claim 1, wherein rotating at least one of the first MCF and the second MCF is performed prior to determining if the markers are aligned.

3. The method of claim 1, wherein the brightness profiles include a first brightness profile of the first MCF and a second brightness profile of the second MCF.

4. The method of claim 1, further comprising:
    generating a warning for direction mismatch if the first and second MCFs are determined to be misaligned in view of the region of the brightness profile associated with the markers,
    flipping one of the first or second MCFs in response to the warning; and
    rotating at least one of the first or second MCFs until each of the plurality of cores of the first MCF and the second MCF are aligned.

5. The method of claim 4, wherein flipping one of the first or second MCFs is performed at least partially autonomously.

6. The method of claim 1, wherein the first and second MCFs define longitudinal axes, and wherein the brightness profiles are taken on lines perpendicular to the longitudinal axes of the first and second MCFs.

7. The method of claim 1, wherein determining rotational orientations of the first and second MCFs is performed in view of a saved data associated with the first and second MCFs.

8. The method of claim 7, wherein the saved data comprises saved brightness profiles, the saved brightness profiles being produced by rotating one or more known MCFs and capturing a brightness profile of each of the one or more known MCFs during rotation.

9. A control system for aligning a first MCF and a second MCF, the first and second MCFs each including a plurality of cores and a marker, the control system comprising:
    a light source;
    a camera;
    an alignment platform configured to align the first multimode optical fiber and second multimode optical fiber; and
    a controller in communication with the light source, the camera, and the alignment platform, the controller operable to:
        produce a brightness profile for the first MCF and for the second MCF;
        determine rotational orientations of the first MCF and the second MCF;
        rotate at least one of the first MCF and the second MCF until each of the plurality of cores of the first MCF and the second MCF are aligned; and
        determine if the markers of the first MCF and the second MCF are aligned in view of a region of the brightness profile associated with the markers, the region including less than the entire brightness profile associated with the markers.

10. The control system of claim 9, wherein the controller is further operable to splice the first MCF and the second MCF together if the cores and the marker of the first MCF are aligned with the cores and marker of the second MCF.

11. The control system of claim 9, wherein the controller is configured to rotate the at least one of the first MCF and the second MCF by controlling the alignment platform.

12. The control system of claim 9, wherein the camera comprises at least two cameras.

13. The control system of claim 12, wherein the controller is further operable to generate a warning for direction mismatch if the first and second MCFs are determined to be misaligned in view of the region of the brightness profile associated with the markers, and wherein the controller is further operable to at least semi-autonomously flip one of the first or second MCFs if the markers are determined to have direction mismatch. *id wherein the controller is further operable to at least semi-autonomously flip one of the first or second MCFs if the markers are determined to have direction mismatch.

14. The control system of claim 12, wherein the controller is further operable to generate a warning for direction mismatch if the first and second MCFs are determined to be misaligned in view of the region of the brightness profile associated with the markers, wherein the first and second MCFs define longitudinal axes, and wherein the light source is configured to emit light toward at least one of the first MCF and second MCF in a direction perpendicular to the longitudinal axis thereof.

15. The control system of claim 12, wherein the controller is further operable to generate a warning for direction mismatch if the first and second MCFs are determined to be misaligned in view of the region of the brightness profile associated with the markers, and wherein the controller determines at least one of rotational orientation of the first MCF and the second MCF or marker alignment in view of saved brightness profiles of one or more known MCFs.

16. A control system for aligning a first MCF and a second MCF, the first and second MCFs each including a plurality of cores and a marker, the control system comprising:
a controller operable to:
produce a brightness profile for the first MCF and for the second MCF;
determine rotational orientations of the first MCF and the second MCF;
rotate at least one of the first MCF and the second MCF until each of the plurality of cores of the first MCF and the second MCF are aligned; and
determine if the markers of the first MCF and the second MCF are aligned in view of a region of the brightness profile associated with the markers, the region including less than the entire brightness profile associated with the markers.

17. The control system of claim 16, wherein the controller is further operable to splice the first MCF and the second MCF together if the cores and the marker of the first MCF are aligned with the cores and marker of the second MCF.

18. The control system of claim 16, wherein the controller is further operable to generate a warning for direction mismatch if the first and second MCFs are determined to be misaligned in view of the region of the brightness profile associated with the markers.

19. The control system of claim 18, wherein the controller is further operable to at least semi-autonomously flip one of the first or second MCFs if the markers are determined to have direction mismatch.

20. The control system of claim 16, wherein the controller determines at least one of rotational orientation of the first MCF and the second MCF or marker alignment in view of saved brightness profiles of one or more known MCFs.

* * * * *